United States Patent
Inoue et al.

(10) Patent No.: US 8,248,235 B2
(45) Date of Patent: Aug. 21, 2012

(54) AREA MONITORING SENSOR

(75) Inventors: Tetsu Inoue, Osaka (JP); Akiji Yamaguchi, Osaka (JP)

(73) Assignee: Keyence Corporation, Osaka (JP)

( * ) Notice: Subject to any disclaimer, the term of this patent is extended or adjusted under 35 U.S.C. 154(b) by 461 days.

(21) Appl. No.: 12/427,156

(22) Filed: Apr. 21, 2009

(65) Prior Publication Data
US 2009/0295580 A1   Dec. 3, 2009

(30) Foreign Application Priority Data
Jun. 3, 2008   (JP) ................................ 2008-145295

(51) Int. Cl.
*G08B 13/18* (2006.01)
(52) U.S. Cl. ........ 340/555; 340/541; 340/556; 340/557; 340/565; 340/566; 250/215; 250/221; 250/222.1; 250/222.2; 250/223 R
(58) Field of Classification Search .............. 340/541, 340/552–557, 565–567; 250/221, 222.1, 250/222.2, 223 R
See application file for complete search history.

(56) References Cited

U.S. PATENT DOCUMENTS

| | | |
|---|---|---|
| 4,464,014 A | 8/1984 | Sick et al. |
| 4,662,707 A | 5/1987 | Teach et al. |
| 4,668,859 A | 5/1987 | Winterer |
| 4,738,529 A | 4/1988 | Hug |
| 4,830,489 A | 5/1989 | Cain et al. |
| 5,137,354 A | 8/1992 | deVos et al. |
| 5,180,922 A | 1/1993 | Hug |
| 5,455,669 A | 10/1995 | Wetteborn |
| 5,539,199 A | 7/1996 | Ruckh et al. |
| 5,635,905 A | 6/1997 | Blackburn et al. |
| 5,641,963 A * | 6/1997 | Mueller ............... 250/342 |
| 6,166,371 A | 12/2000 | Milbrath et al. |
| 2004/0189468 A1 | 9/2004 | Brunner |

(Continued)

FOREIGN PATENT DOCUMENTS

DE    3606594 A1    9/1987

(Continued)

OTHER PUBLICATIONS

Kumekawa et al., "'Safety confirmation-type' measures for AGV collision prevention," Proceedings of the 5th International Conference Automated Guided Vehicle Systems, Oct. 1987, pp. 207-218 (13 pages).

(Continued)

*Primary Examiner* — George Bugg
*Assistant Examiner* — Ojiako Nwugo
(74) *Attorney, Agent, or Firm* — Kilyk & Bowersox, P.L.L.C.

(57) ABSTRACT

This invention provides an area monitoring sensor capable of setting a monitor area without connecting a terminal device for area setting. The area monitoring sensor that emits detection light in different emitting directions and senses an intruder within a monitor area based on reflection of the detection light, the monitor area being previously set as a polygonal shaped area defined by three or more sides, the sensor being provided on a first side out of the sides of the monitor area, and includes a side selecting unit that selects a second side other than the first side out of the three or more sides that define the monitor area based on an operation input; a distance specifying unit that specifies a distance between the area monitoring sensor and the second side that is being selected by the side selecting unit based on an operation input.

11 Claims, 13 Drawing Sheets

U.S. PATENT DOCUMENTS

| | | |
|---|---|---|
| 2006/0049340 A1* | 3/2006 | Haberer et al. ............... 250/221 |
| 2008/0296474 A1 | 12/2008 | Yamaguchi |
| 2009/0091447 A1* | 4/2009 | Iwasawa ...................... 340/557 |
| 2009/0283666 A1 | 11/2009 | Tagashira |
| 2009/0287453 A1 | 11/2009 | Oh |
| 2009/0289791 A1 | 11/2009 | Onishi |
| 2009/0295577 A1 | 12/2009 | Yamaguchi |
| 2010/0193668 A1 | 8/2010 | Kawabata |
| 2010/0194583 A1 | 8/2010 | Kawabata |
| 2010/0198365 A1 | 8/2010 | Kawabata et al. |

FOREIGN PATENT DOCUMENTS

| | | |
|---|---|---|
| DE | 3735905 A1 | 5/1989 |
| JP | H1-158376 | 6/1989 |
| JP | H036408 | 1/1991 |
| JP | 03-175390 | 7/1991 |
| JP | 04-310890 | 11/1992 |
| JP | H04310890 | 11/1992 |
| JP | 2008-298646 | 12/2008 |
| WO | 9205455 A1 | 4/1992 |

OTHER PUBLICATIONS

Nishide et al., "Automatic Position Findings of Vehicle by Means of Laser," Proceedings 1986 IEEE International Conference on Robotics and Automation, Apr. 1986, pp. 1343-1348 (7 pages).

* cited by examiner

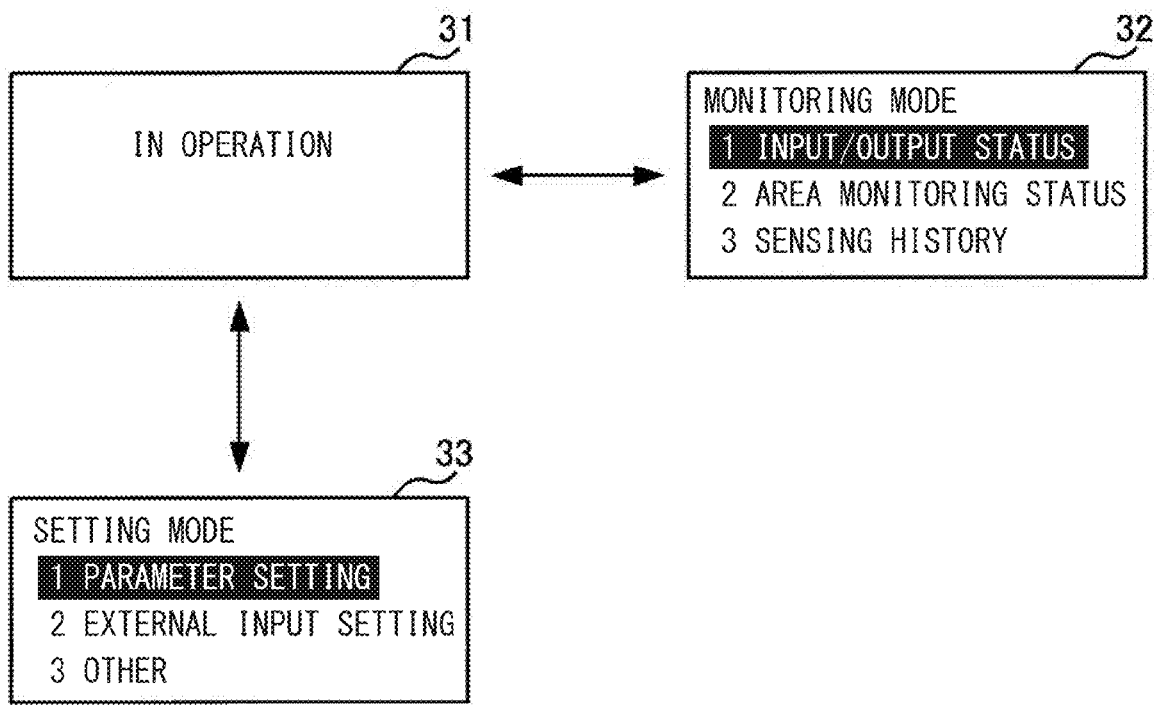

AREA MONITORING SENSOR

CROSS-REFERENCE TO RELATED APPLICATIONS

The present application claims foreign priority based on Japanese Patent Application No. 2008-145295, filed Jun. 3, 2008, the contents of which is incorporated herein by reference.

BACKGROUND OF THE INVENTION

1. Field of the Invention

The present invention relates to an area monitoring sensor, and in particular, to an improvement of an area monitoring sensor that emits detection light in different directions and senses an intruder within a monitor area based on reflection of the detection light.

2. Description of the Related Art

Area monitoring sensors have been known as a sensor which senses an intruder such as a person entered into a no entrance area and outputs a detection signal. A typical area monitoring sensor is provided with, for example, a light projecting unit that projects detection light, a scanning unit that scans the detection light, and a light receiving unit that receives the detection light reflected on the intruder, and a distance and a direction toward the intruder are sensed based on an output from the light receiving unit. Then, based on a result of the sensing, it is determined whether or not the intruder is present within a predetermined area, and the detection signal is outputted based on a result of the determination. This detection signal is used, for example, as a control signal that stops a machine tool working near the monitored area.

Typically, an area setting tool is used in order to specify an area for sensing as a monitor area to such an area monitoring sensor, or in order to edit the monitor area that has been set. The area setting tool is an application program that runs on a terminal device such as a personal computer, and can set a monitor area according to how factory equipment such as machine tools are placed.

With the method of setting the monitor area using the area setting tool, however, it is adversely required to connect the terminal device to the area monitoring sensor every time a monitor area is newly specified or a monitor area that has already been specified is modified, which results in poor operability.

SUMMARY OF THE INVENTION

In view of the above problems, an object of the present invention is to provide an area monitoring sensor capable of setting a monitor area without connecting a terminal device for area setting. In particular, the present invention aims to provide an area monitoring sensor capable of arbitrarily setting a size of a monitor area defined as an area of a polygonal shape having a plurality of sides. The present invention further aims to provide an area monitoring sensor capable of preventing an erroneous setting of a monitor area.

Moreover, another object of the present invention is to provide an area monitoring sensor capable of monitoring a result of sensing of an intruder. In particular, the present invention aims to provide an area monitoring sensor capable of displaying a position of an intruder that is sensed when setting a size of a monitor area according to a side selected to input a distance.

An area monitoring sensor according to a first aspect of the present invention is applied to an area monitoring sensor that emits detection light in different emitting directions and senses an intruder within a monitor area based on reflection of the detection light, the monitor area being previously set as a polygonal shaped area defined by three or more sides, the sensor being provided on a first side out of the sides of the monitor area. Specifically, the sensor includes: a side selecting unit that selects a second side other than the first side out of the three or more sides that define the monitor area based on an operation input; a distance specifying unit that specifies a distance between the area monitoring sensor and the second side that is being selected by the side selecting unit based on an operation input; and an area size determining unit that determines a size of the monitor area based on the distance that has been specified by the distance specifying unit.

With the area monitoring sensor, it is possible to select the side other than the side on which the area monitoring sensor is provided out of the plurality of sides that define the monitor area, and to specify the distance between the area monitoring sensor and the side that is being selected. Further, as the size of the monitor area is determined based on the distance thus specified, it is possible to arbitrarily set the size of the monitor area whose shape is predetermined as the polygonal shaped area defined by the plurality of sides.

In addition to the above configuration, the area monitoring sensor according to a second aspect of the present invention further includes: a test sensing zone forming unit that forms a test sensing zone that includes at least one side other than the first side out of the monitor area, the zone being formed along the at least one side; and a first intruder sensing unit that senses an intruder within the test sensing zone based on reflection of the detection light. According to such a configuration, as the test sensing zone is formed to sense the intruder in the test sensing zone, it is possible to confirm whether or not the inputted values for the distances are appropriate for each side.

In addition to the above configuration, the area monitoring sensor according to a third aspect of the present invention further includes: a boundary sensing unit that senses that the intruder has entered the test sensing zone that corresponds to the at least one side other than the first side based on a result of the sensing by the first intruder sensing unit, wherein when an entrance of the intruder has been sensed for all of the sides at least other than the first side, the area size determining unit determines the size of the monitor area based on the distance specified by the distance specifying unit. According to such a configuration, as the size of the monitor area is determined when the entrance of the intruder has been sensed for all of the sides at least other than the first side, it is possible to prevent the monitor area from being erroneously set.

In addition to the above configuration, the area monitoring sensor according to a fourth aspect of the present invention further includes: a boundary sensing unit that senses that the intruder has entered the test sensing zone that corresponds to the at least one side other than the first side based on a result of the sensing by the first intruder sensing unit; and an area boundary display unit that displays each side at least other than the first side out of the three or more sides that define the monitor area by two or more adjacent symbols, wherein when an entrance of the intruder has been sensed by the boundary sensing unit, the area boundary display unit displays one of the symbols corresponding to a position at which the intruder has entered differently from other symbols. According to such a configuration, as the symbol corresponding to the position at which the intruder has entered is displayed differently from other symbols when the entrance of the intruder has been sensed, it is possible to identify the position on the side at which the intruder has entered.

In addition to the above configuration, the area monitoring sensor according to a fifth aspect of the present invention further includes: a second intruder sensing unit that senses an intruder based on reflection of the detection light; and an intruder position display unit that displays a distance to the intruder sensed by the second intruder sensing unit, wherein the intruder position display unit displays the distance to the intruder in a direction perpendicular to the second side that is being selected by the side selecting unit. According to such a configuration, as the position of the intruder is displayed by the distance to the intruder in the direction perpendicular to the side that is being selected, it is possible to display the intruder that has been sensed when setting the size of the monitor area according to the side selected to input the distance.

In addition to the above configuration, the area monitoring sensor according to a sixth aspect of the present invention further includes: an area boundary display unit that displays each side at least other than the first side out of the three or more sides that define the monitor area by two or more adjacent symbols, wherein the area boundary display unit displays the second side that is being selected by the side selecting unit distinguishably from other sides.

According to the area monitoring sensor of the present invention, it is possible to select the side other than the side on which the area monitoring sensor is provided out of the plurality of sides that define the monitor area, and to specify the distance between the area monitoring sensor and the side that is being selected. Further, as the size of the monitor area is determined based on the distance thus specified, it is possible to arbitrarily set the size of the monitor area whose shape is predetermined as the polygonal shaped area defined by the plurality of sides. Therefore, it is possible to set the monitor area without connecting a terminal device for area setting. Further, as the test sensing zone is formed to sense the intruder in the test sensing zone, it is possible to confirm whether or not the inputted values for the distances are appropriate for each side. In particular, as the size of the monitor area is determined when the entrance of the intruder has been sensed for all of the sides at least other than the first side, it is possible to prevent the monitor area from being erroneously set.

Moreover, according to the area monitoring sensor of the present invention, as the position of the intruder is displayed by the distance to the intruder in the direction perpendicular to the side that is being selected, it is possible to display the intruder that has been sensed when setting the size of the monitor area according to the side selected to input the distance, thereby monitoring the result of the sensing of the intruder.

BRIEF DESCRIPTION OF THE DRAWINGS

FIG. 3 is a transition diagram illustrating a configurational example of the safety sensor 1 shown in FIG. 2, in which screens 31 to 33 that are displayed in an operating mode, a monitoring mode, and a setting mode are shown;

DETAILED DESCRIPTION OF THE PREFERRED EMBODIMENTS

First Embodiment

Sensing System

Figure 1:
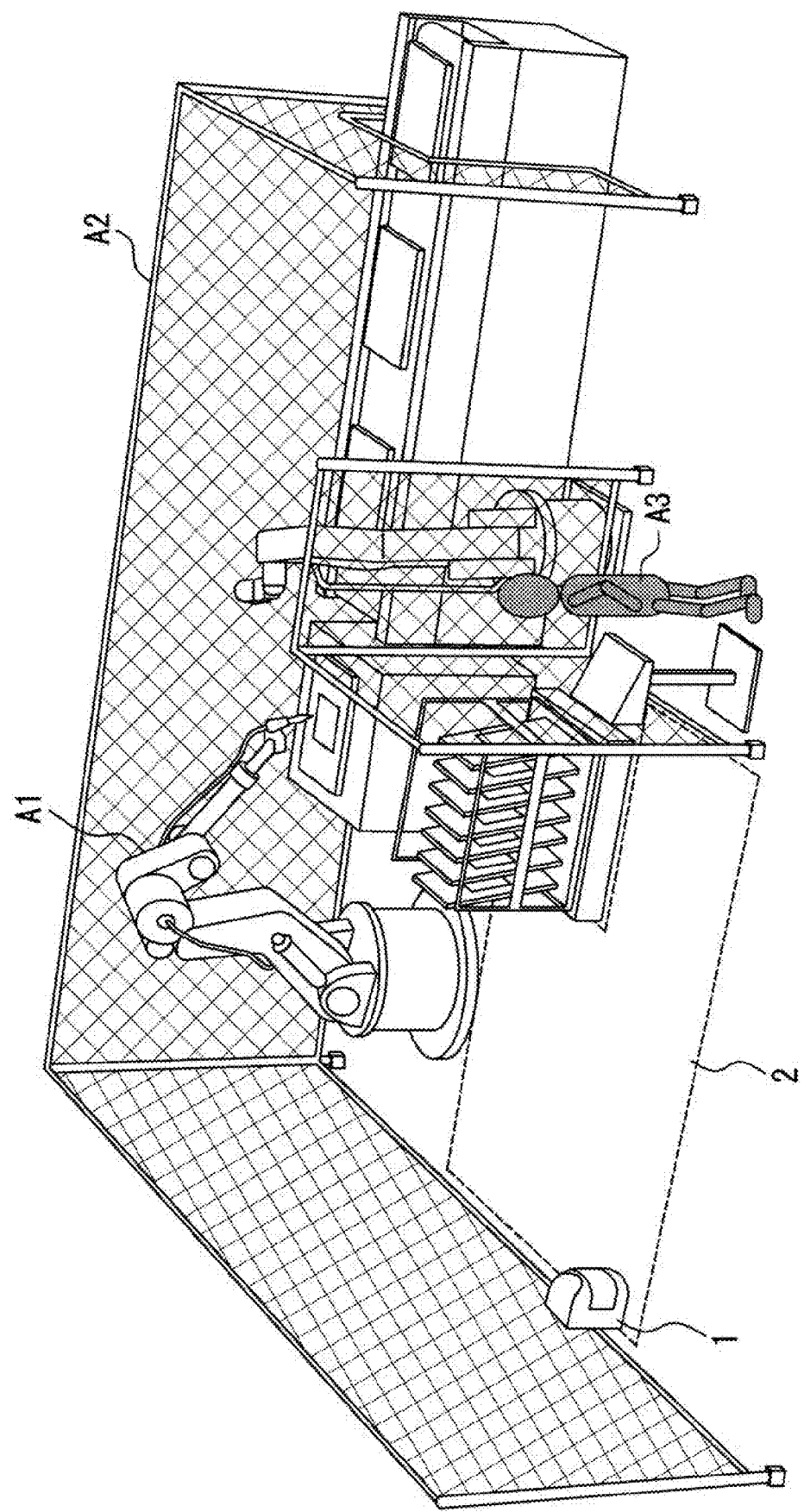
FIG. 1 is a perspective view illustrating one configurational example of a sensing system including an area monitoring sensor according to a first embodiment of the present invention, in which a light scanning safety sensor 1 is shown.

FIG. 1 is a perspective view illustrating one configurational example of a sensing system including an area monitoring sensor according to a first embodiment of the present invention, in which a light scanning safety sensor 1 is shown as one example of the area monitoring sensor. In the sensing system, machines such as a carrier machine and a machining robot A1 are placed within an area that is partitioned by a safety barrier A2, an area around machinery and equipment such as a work area of the robot is set a monitor area 2, and an intruder within the monitor area 2 is sensed by the safety sensor 1.

The safety sensor 1 monitors the monitor area 2 having a complex shape by scanning detection light over the area, senses presence of an intruder such as an operator A3 who operates a control panel of the machinery and equipment, and outputs a detection signal. The sensing of the intruder is carried out based on reflection of the detection light on the intruder by emitting the detection light in different emitting directions.

The detection signal is used, for example, as a control signal that stops the machining robot A1 working near the monitor area 2. Specifically, the safety sensor 1 includes an output signal switching device (OSSD) output, and outputs an operation enable signal when no intruder is present within the monitor area 2 (OSSD ON status) and an operation disable signal when any intruder is present within the monitor area 2 (OSSD OFF status).

Area Monitoring Sensor

Figure 2A:
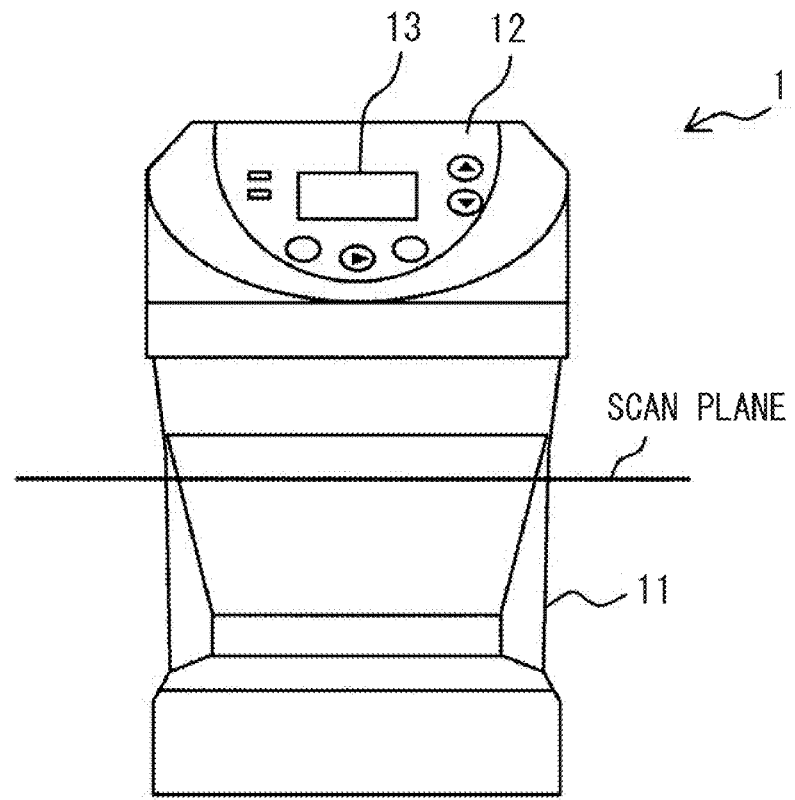
FIGS. 2A and 2B are diagrams each illustrating a configurational example of the safety sensor 1 of the sensing system shown in FIG. 1.
Figure 2B:
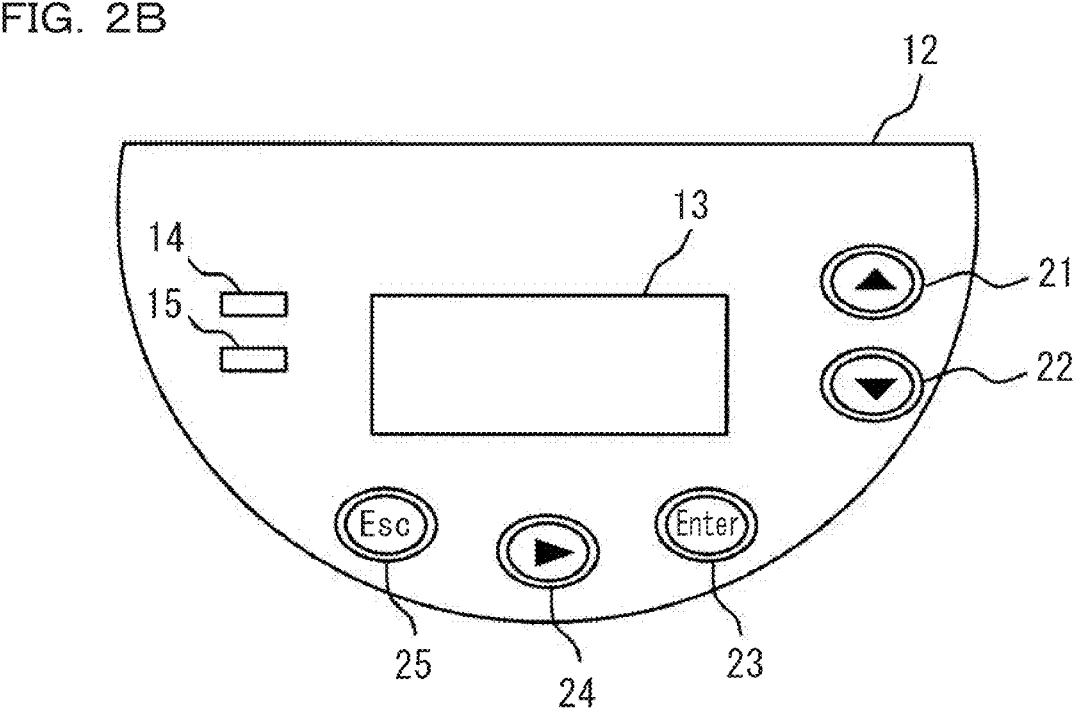

FIGS. 2A and 2B are diagrams each illustrating a configurational example of the safety sensor 1 of the sensing system shown in FIG. 1. In FIG. 2A, the sensor is shown from a front side thereof, and in FIG. 2B, an operation panel 12 provided for the safety sensor 1 is shown.

The safety sensor 1 is a light scanning area monitoring sensor that senses an intruder within the monitor area 2 by scanning the detection light across a horizontal scan plane. The safety sensor 1 is configured by, for example, a light projecting unit that projects the detection light, a scanning unit that scans the detection light in horizontal direction repeatedly at a constant interval, a light receiving unit that receives the detection light reflected on the intruder, and a sensing unit that outputs the detection signal based on a result of the reception of the detection light.

As the detection light, for example, a laser beam of a wavelength in an infrared range is used. The monitor area 2 in a horizontal plane is monitored by scanning the detection light in horizontal direction, and the intruder within the monitor area 2 is sensed by the reception of light reflected from the intruder.

Specifically, a distance between the safety sensor 1 and the intruder is calculated based on a light projecting timing of the detection light and a light receiving timing of the detection light reflected on the intruder. Further, a direction of the intruder is calculated by determining the emitting direction of the detection light based on the control signal of the scanning unit. Then, it is determined whether or not the intruder is present within the monitor area 2 based on the calculated distance and direction, and the detection signal is outputted based on a result of the determination.

The safety sensor 1 includes a cover 11 that covers the light projecting unit, the scanning unit, the light receiving unit and the like, and the operation panel 12. The operation panel 12 is provided with a plurality of operation keys 21 to 25, a display 13, and LED indicators 14 and 15.

The operation keys 21 to 25 are contact type tact switches used for inputting a value or selecting a menu when setting the monitor area. The operation keys 21 and 22 are for inputting a value or switching a screen. For example, the operation key 21 can be used as an up key for incrementing a value. Further, the operation key 22 can be used as a down key for decrementing a value.

The operation keys 23 to 25 are for switching between the working modes and confirming the setting values. For example, the operation key 23 is an enter key (Enter), the operation key 24 is a mode switching key, and the operation key 25 is an escape key (Esc).

The display 13 is a display unit for displaying sensing information of an intruder and input operation information, and for example, a liquid crystal display capable of displaying 12 characters×4 lines is used.

The LED indicators 14 and 15 are display units each indicating an operation status by a LED (light emitting diode). The LED indicator 14 indicates an OSSD output, and the LED indicator 15 indicates whether or not a main body of the sensor is in an interlock status.

Working Mode

FIG. 3 is a transition diagram illustrating a configurational example of the safety sensor 1 shown in FIG. 2, in which screens 31 to 33 that are displayed on the display 13 in an operating mode, a monitoring mode, and a setting mode are shown. The screen 31 is a screen in the operating mode, and the screen 32 is a menu screen in the monitoring mode.

The operating mode is the working mode in which an intruder within the monitor area 2 is sensed and the detection signal is outputted. The monitoring mode is the working mode in which an input/output status, an area monitoring condition, a sensing history, and the like are displayed. As the input/output status, an OSSD output status, an input status of an external relay circuit, and the like can be monitored. As the area monitoring condition, a shape and a size of the monitor area that has been set, a distance to the intruder that has been sensed, and the like can be monitored. As the sensing history, a position and sensing time of the intruder that has triggered to turn off the OSSD, error information, and the like are held as the sensing history during the OSSD OFF, and can be displayed as needed.

It is possible to switch from the operating mode to the monitoring mode by operating the operation key 23, for example. Further, operating the operation key 25 in the monitoring mode, for example, allows the mode to return to the operating mode.

In the screen 32, selectable menu items are arranged, and the menu items to be displayed can be altered by operating the operation keys 21 and 22, for example.

The screen 33 is a menu screen in the setting mode. The setting mode is the working mode in which parameters for specifying the monitor area and external input are set. It is possible to switch from the operating mode to the setting mode by operating the operation key 24, for example. Further, operating the operation key 24 again in the setting mode allows the mode to return to the operating mode.

In the screen 33, selectable menu items are arranged, and a desired menu item can be selected by operating the operation keys 21 and 22, for example.

Setting Mode

Figure 4:
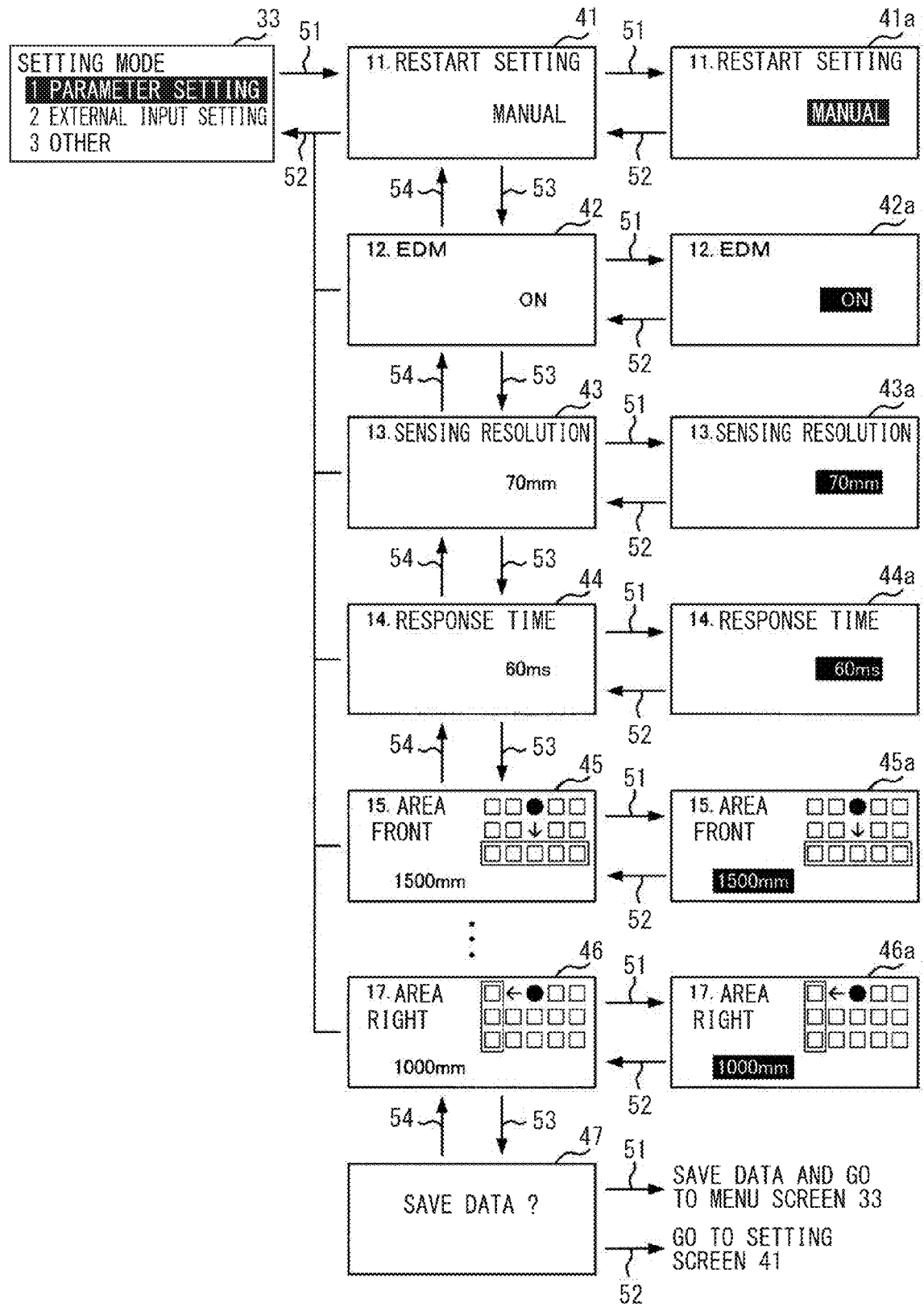
FIG. 4 is a transition diagram illustrating a configurational example of the safety sensor 1 shown in FIG. 2, in which one example of screens that can be switched during the setting mode is shown.

FIG. 4 is a transition diagram illustrating a configurational example of the safety sensor 1 shown in FIG. 2, in which one example of screens that can be switched during the setting mode is shown. In the setting mode, by selecting a menu item "1 Parameter Setting" on the screen 33 and carrying out an operation 51 by the operation key 23, screens 41 to 46 for setting the parameters can be displayed.

The setting screens 41 to 46 are screens for setting operation parameters when sensing the intruder, and restart setting, EDM, sensing resolution, response time, and the size of the monitor area are provided as changeable parameters. The setting screen 41 is the setting screen first displayed by the operation 51, and the setting screens 42 to 46 can be sequentially displayed by carrying out the operation 53 by operating the operation key 22. Further, when the setting screens 41 to 46 are displayed, carrying out the operation 52 by operating the operation key 25 allows the screen to return to the menu screen 33.

The setting screen 41 is the screen for setting a parameter for restart, with which it is possible to select whether the sensor main body is to be restarted manually or automatically. When the setting screen 41 is displayed, a screen 41a for inputting the parameter can be displayed by carrying out the operation 51 by operating the operation key 23. In the input screen 41a, the parameter can be altered by operating the operation keys 21 and 22. Further, carrying out the operation 52 by operating the operation key 25 allows the screen to return to the setting screen 41 without changing the parameter.

On the other hand, when the setting screen 41 is displayed, it is possible to switch to the setting screen 42 for setting the EDM by carrying out the operation 53 by operating the operation key 22. The setting screen 42 is the screen for setting a parameter for EDM, with which it is possible to select whether a function for external relay monitoring is to be turned on or off. When the setting screen 42 is displayed, a screen 42a for inputting the parameter can be displayed by carrying out the operation 51 by operating the operation key 23. Carrying out the operation 54 by operating the operation key 21 allows the screen to return to the setting screen 41.

When the setting screen 42 is displayed, it is possible to switch to the setting screen 43 for setting the sensing resolution by carrying out the operation 53 by operating the operation key 22. The setting screen 43 is the screen for setting a parameter relating to the resolution when sensing the intruder, with which it is possible to arbitrarily specify the resolution within a predetermined range. When the setting screen 43 is displayed, a screen 43a for inputting the parameter can be displayed by carrying out the operation 51 by operating the operation key 23. Carrying out the operation 54 by operating the operation key 21 allows the screen to return to the setting screen 42.

When the setting screen 43 is displayed, it is possible to switch to the setting screen 44 for setting the response time by carrying out the operation 53 by operating the operation key 22. The setting screen 44 is the screen for setting a parameter relating to the response time when sensing the intruder, with which it is possible to arbitrarily specify the response time within a predetermined range. When the setting screen 44 is displayed, a screen 44a for inputting the parameter can be displayed by carrying out the operation 51 by operating the operation key 23. Carrying out the operation 54 by operating the operation key 21 allows the screen to return to the setting screen 43.

When the setting screen 44 is displayed, it is possible to switch to the setting screen 45 for setting the monitor area by carrying out the operation 53 by operating the operation key 22. The setting screen 45 is the screen for setting a distance to a front boundary as the size of the monitor area, with which it is possible to arbitrarily specify the distance within a predetermined range. When the setting screen 45 is displayed, a screen 45a for inputting the parameter can be displayed by carrying out the operation 51 by operating the operation key 23. Carrying out the operation 54 by operating the operation key 21 allows the screen to return to the setting screen 44.

When the setting screen 45 is displayed, it is possible to switch to the setting screen for setting a distance to a left boundary as the size of the monitor area by carrying out the operation 53 by operating the operation key 22. Further, when this setting screen is displayed, it is possible to switch to a setting screen 46 for setting a distance to a right boundary as the size of the monitor area by carrying out the operation 53 by operating the operation key 22. When the setting screen 46 is displayed, a screen 46a for inputting the parameter can be displayed by carrying out the operation 51 by operating the operation key 23.

When the setting screen 46 is displayed, it is possible to switch to a save screen 47 for confirming setting values for the parameters by carrying out the operation 53 by operating the operation key 22. When the save screen 47 is displayed, the setting values for the parameters are confirmed by carrying out the operation 51 by operating the operation key 23, and then it is possible to switch to the menu screen 33 after saving the setting values in a memory. On the other hand, carrying out the operation 52 by operating the operation key 25 without confirming the setting values for the parameters allows the screen to return to the setting screen 41. Further, the test sensing as described later can be set as a requirement for confirming the setting values for the parameters. Specifically, by carrying out the operation 51 by operating the operation key 23 when the save screen 47 is displayed, the setting values for the parameters are written into the memory, and contents written into the memory are read out to confirm if the setting values for the parameters are correctly written into the memory. Confirmation of the size of the monitor area can be carried out by the test sensing in addition to the confirmation by the values, and the setting values for the size of the monitor area are confirmed by the test sensing. It should be appreciated that the output of the operation disable signal (OSSD OFF) is still active when the setting values for the parameters written into the memory are not confirmed.

Functional Configuration

Figure 5:
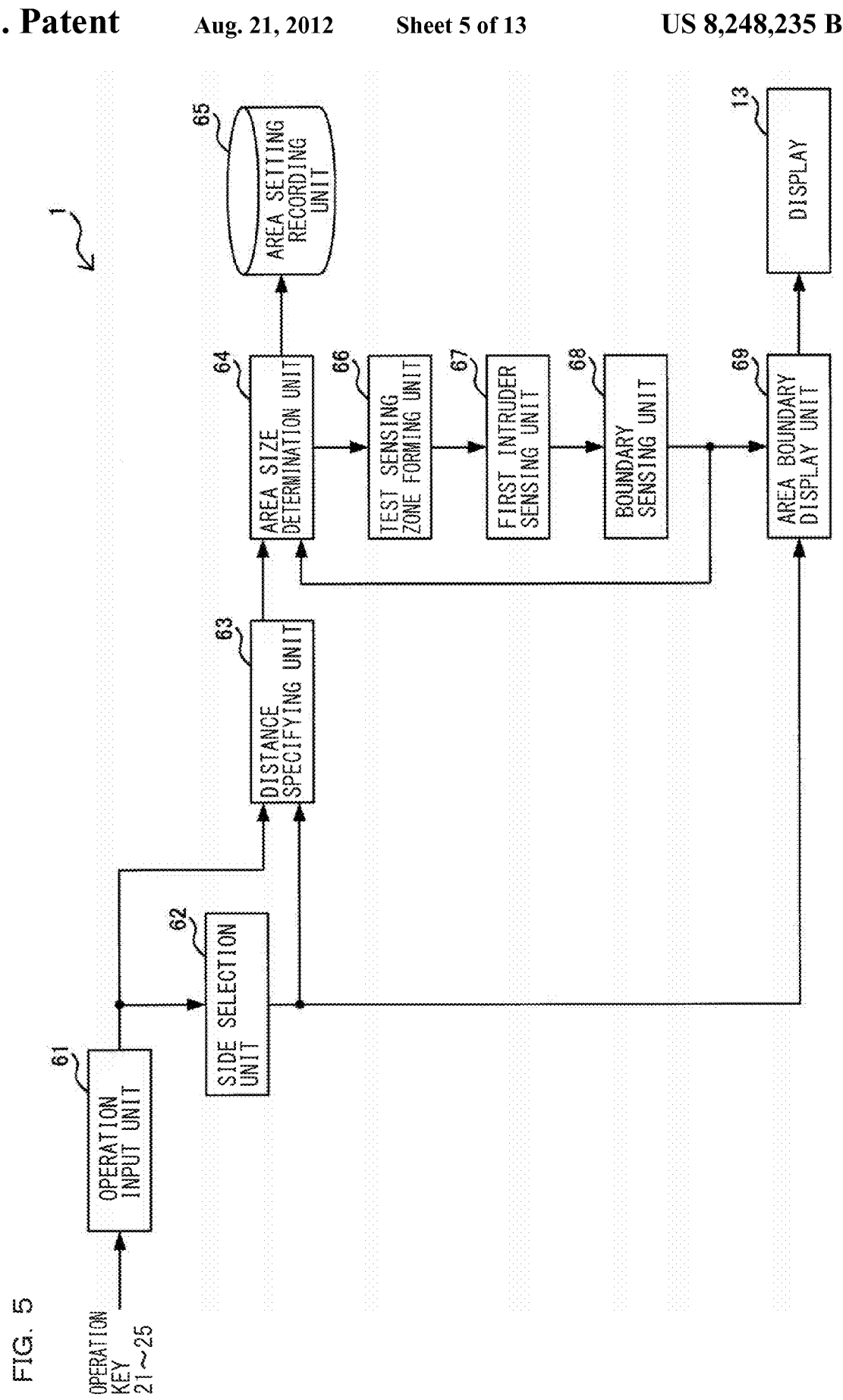
FIG. 5 is a block diagram illustrating a configurational example of the safety sensor 1 shown in FIG. 2, in which one example of a functional configuration in the safety sensor 1 is shown.

FIG. 5 is a block diagram illustrating a configurational example of the safety sensor 1 shown in FIG. 2, in which one example of a functional configuration in the safety sensor 1 is shown. The safety sensor 1 includes, in addition to the operation keys 21 to 25 and the display 13, an operation input unit 61, a side selection unit 62, a distance specifying unit 63, an area size determination unit 64, an area setting recording unit 65, a test sensing zone forming unit 66, a first intruder sensing unit 67, a boundary sensing unit 68, and an area boundary display unit 69. The operation input unit 61 generates predetermined input signals based on the operations of the operation keys 21 to 25.

The safety sensor 1 senses an intruder within the monitor area that has been determined previously, based on the reflected light when the detection light is emitted in the different directions. In this example, the monitor area is an area in a polygonal shape defined by three or more sides, and the safety sensor 1 is provided on one of the sides that define the monitor area.

The side selection unit 62 selects one of the three or more sides that define the monitor area based on an input signal from the operation input unit 61. The side selection unit 62 can select an arbitrarily side to change the parameter, out of the sides on which the safety sensor 1 is not provided.

The distance specifying unit 63 specifies a distance between the safety sensor 1 and the side that is being selected by the side selection unit 62, based on an input signal from the operation input unit 61.

The area size determination unit 64 determines the size of the monitor area based on the distance specified by the distance specifying unit 63. The area setting recording unit 65 holds area setting information for designating the monitor area used as an area for sensing the intruder in the operating mode. When newly setting the monitor area or changing the monitor area that has been set, the area size determination unit 64 determines the size of the monitor area based on the distance specified by the distance specifying unit 63 and updates the area setting information in the area setting recording unit 65.

The test sensing zone forming unit 66 forms a test sensing zone used to confirm whether or not the monitor area defined by the distance specified by the distance specifying unit 63 is appropriate. The test sensing zone is an area including a boundary line of the monitor area and defined by the boundary line. Specifically, the test sensing zone is formed as an area with a line width of the boundary line being increased to a certain amount.

In this example, the test sensing zone is formed as an area including at least one side of the monitor area and defined by the at least one side. For example, the test sensing zone is formed as an area including three sides excluding the side on which the safety sensor 1 is provided.

The first intruder sensing unit 67 emits the detection light in the different directions, and senses the intruder within the test sensing zone based on reflection of the detection light.

The boundary sensing unit 68 senses that the intruder has entered the test sensing zone that corresponds to the side of the monitor area based on a result of sensing by the first intruder sensing unit 67. The boundary sensing unit 68 is capable of sensing the entrance of the intruder at least for the sides on which the safety sensor 1 is not provided.

The area size determination unit 64, when the entrance of the intruder is sensed at least for all of the sides except the side on which the safety sensor 1 is provided, determines the size of the monitor area based on the distance specified by the distance specifying unit 63.

The area boundary display unit 69, in order to graphically display the shape of the monitor area, displays the monitor area by a plurality of symbols that are adjacent to at least the sides on which the safety sensor 1 is not provided out of the three or more sides that define the monitor area on the display 13.

The area boundary display unit 69, when the boundary sensing unit 68 senses the intruder, displays the symbol that corresponds to a position at which the intruder has entered differently from other symbols. Further, the area boundary display unit 69 displays the side that is being selected by the side selection unit 62 distinguishably from other sides.

Monitor Area

Figure 6:
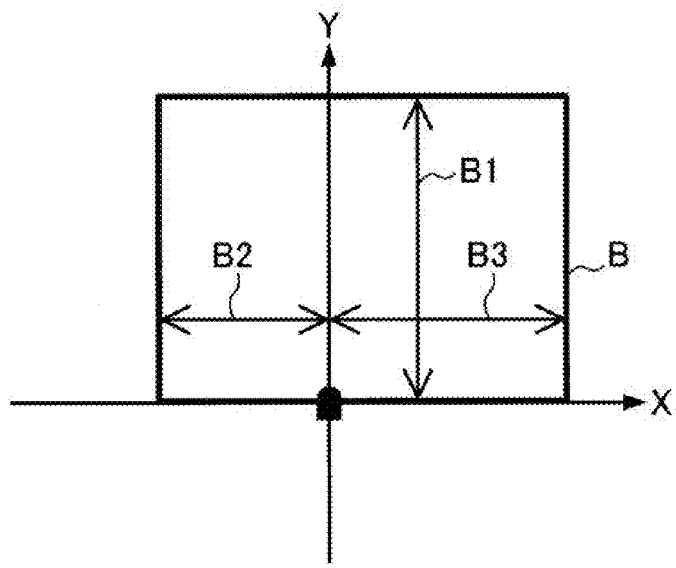
FIG. 6 is a diagram illustrating one example of an operation of the safety sensor 1 shown in FIG. 2, in which changeable parameters B1 to B3 as an area size are shown.

FIG. 6 is a diagram illustrating one example of an operation of the safety sensor 1 shown in FIG. 2, in which changeable parameters B1 to B3 as an area size are shown when the monitor area is set as the rectangular area B. The area B as the monitor area is a rectangular area defined by four sides, and the safety sensor 1 is provided on one of the four sides.

In this example, the size of the monitor area can be specified using Cartesian coordinates centering the safety sensor 1 with one coordinate axis (X axis) provided along the one side of the area B and the other coordinate axis (Y axis) provided along the forward direction of the safety sensor 1.

Specifically, a distance to a boundary line (front boundary line) of the area B positioned on a forward side with respect to the safety sensor 1 can be specified as the parameter B1. The parameter B1 represents the distance between the X axis and the front boundary line.

Further, a distance to a boundary line (left boundary line) of the area B positioned on a left side with respect to the safety sensor 1 can be specified as the parameter B2. The parameter B2 represents the distance between the Y axis and the left boundary line. Further, a distance to a boundary line (right boundary line) of the area B positioned on a right side with respect to the safety sensor 1 can be specified as the parameter B3. The parameter B3 represents the distance between the Y axis and the right boundary line.

FIGS. 7A to 7C are diagrams each illustrating one example of the operation in an area size setting of the safety sensor 1 shown in FIG. 2, in which an input screen when setting the size of the monitor area is shown. FIG. 7A shows the input screen when setting the distance to the front boundary line. In this input screen, the shape of the monitor area is graphically displayed using the plurality of symbols. Specifically, the monitor area is displayed using the symbols 71 that are arranged in a matrix of three lows and four columns. In other words, the monitor area is displayed by the plurality of symbols that are adjacent to at least the sides on which the safety sensor 1 is not provided out of the four sides that define the monitor area.

In this example, the short side of the area B is represented by three symbols 71, and the long side is represented by five symbols 71. Further, the safety sensor 1 is provided at a center of the long side, at which a symbol 72 that represents the safety sensor 1 is displayed.

Further, the side selection unit 62 displays the side that is being selected distinguishably from the other sides. Specifically, the front boundary line of the area B is selected, and indicated as the side that is being selected by a box 73 that encloses the five symbols 71 positioned along the long side which is the front boundary line.

In this input screen, a display section 74 for displaying the setting value (numeric value) for the distance is provided, and it is possible to change the setting value for the distance to the front boundary line "1500 mm" by operating the operation keys 21 and 22. The symbols for showing the shape of the monitor area are disposed on a right side within the input screen, and the display section is on a lower left within the input screen.

FIG. 7B shows the input screen when setting the distance to the left boundary line. In this input screen, the left boundary line of the area B is selected, and indicated as the side that is being selected by the box 73 that encloses the three symbols 71 positioned along the short side which is the left boundary line.

In this input screen, the display section 74 for displaying the setting value (numeric value) for the distance is provided, and it is possible to change the setting value for the distance to the left boundary line "800 mm" by operating the operation keys 21 and 22.

FIG. 7C shows the input screen when setting the distance to the right boundary line. In this input screen, the right boundary line of the area B is selected, and indicated as the side that is being selected by the box 73 that encloses the three symbols 71 positioned along the short side which is the right boundary line.

In this input screen, the display section 74 for displaying the setting value (numeric value) for the distance is provided, and it is possible to change the setting value for the distance to right boundary line "1000 mm" by operating the operation keys 21 and 22.

When a square area is previously set as the monitor area, the size of the monitor area can be determined only by specifying the distance to the front boundary line as the parameter.

Figure 7:
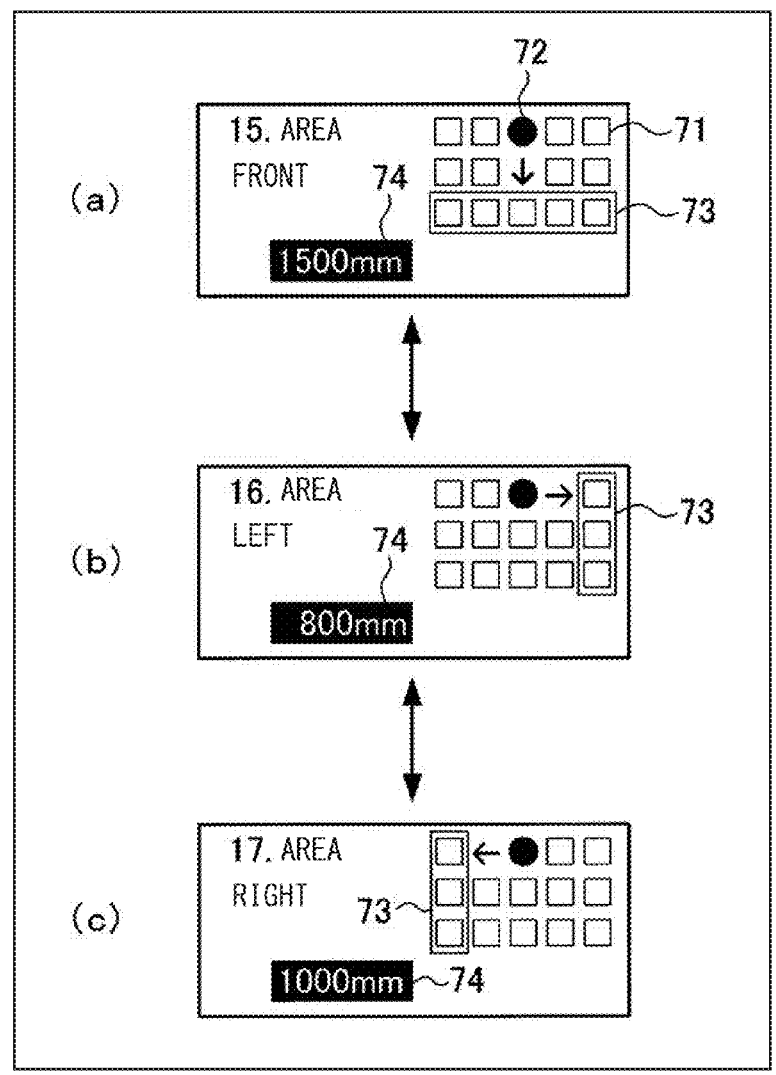
FIGS. 7A to 7C are diagrams each illustrating one example of an operation in an area size setting of the safety sensor 1 shown in FIG. 2, in which an input screen when setting a size of a monitor area is shown.

In FIGS. 6 and 7, the example in which the rectangular area B is previously set as the monitor area is described. However, the monitor area can be set as an area in a different shape. An example in which the monitor area is set as an area of a shape other than the rectangular shape will be described with reference to FIGS. 8 to 10.

Figure 8:
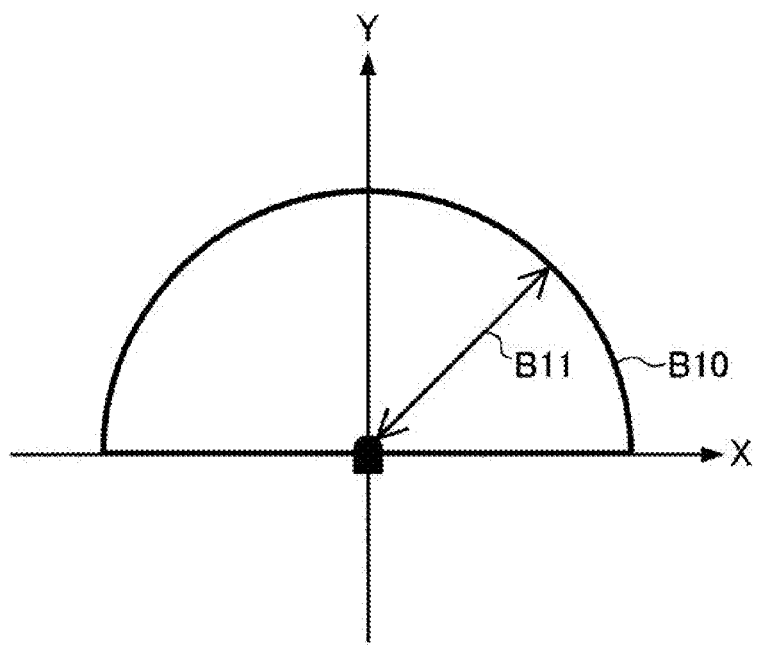
FIG. 8 is a diagram illustrating one example of the operation of the safety sensor 1 shown in FIG. 2, in which the monitor area is set as a semicircular area B10.

FIG. 8 is a diagram illustrating one example of the operation of the safety sensor 1 shown in FIG. 2, in which a changeable parameter B11 as the area size when the monitor area is set as a semicircular area B10 is shown. The area B10 as the monitor area is a semicircle shaped area defined by an arc centering the safety sensor and a diameter, and the area is provided in a symmetric fashion along the forward direction with respect to the safety sensor 1.

The size of the monitor area is determined by specifying a radius of the area B10 as the parameter B11.

Figure 9:
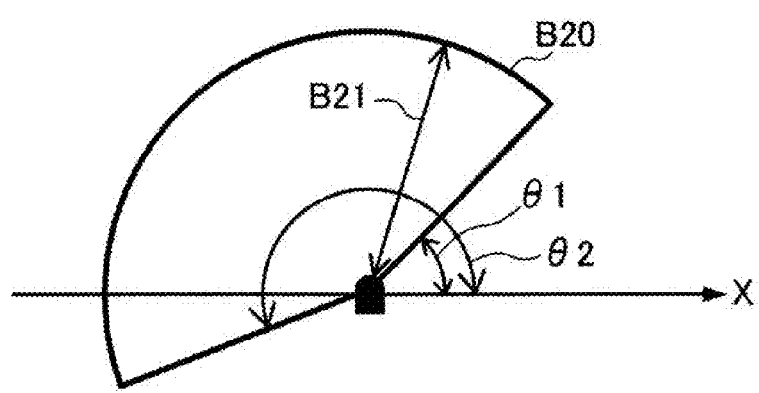
FIG. 9 is a diagram illustrating one example of the operation of the safety sensor 1 shown in FIG. 2, in which the monitor area is set as a fan-shaped area B20.

FIG. 9 is a diagram illustrating one example of the operation of the safety sensor 1 shown in FIG. 2, in which changeable parameters B21, θ1, and θ2 as the area size when the monitor area is set as a fan-shaped area B20 are shown. The area B20 as the monitor area is defined by a fan-shaped area of a circle centering the safety sensor 1.

The size of the monitor area is determined by specifying a radius of the area B20 as the parameter B21, and a starting angle and an ending angle for sensing the intruder respectively as the parameters θ1 and θ2.

Figure 10:
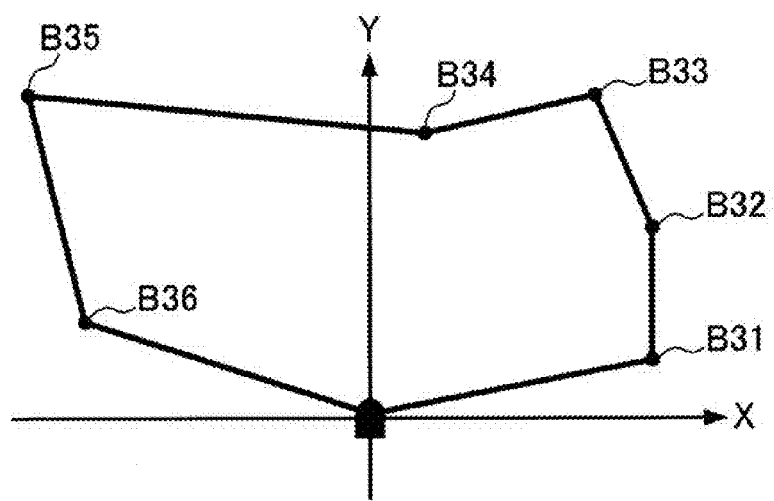
FIG. 10 is a diagram illustrating one example of the operation of the safety sensor 1 shown in FIG. 2, in which the monitor area is formed by connecting a plurality of vertices B31 to B36.

FIG. 10 is a diagram illustrating one example of the operation of the safety sensor 1 shown in FIG. 2, in which the monitor area is specified as a polygonal shaped area formed by connecting a plurality of vertices B31 to B36. This area as the monitor area is specified, by sequentially specifying coordinates of the plurality of vertices B31 to B36, as a shape connecting these vertices and the safety sensor 1 with a line.

For example, when (800 mm, 50 mm), (800 mm, 400 mm), (600 mm, 550 mm), (100 mm, 420 mm), (−850 mm, 550 mm), and (−700 mm, 90 mm) are inputted as the coordinates of the vertices in this order, the polygonal shaped area defined by connecting the vertices is determined as the monitor area.

Test Sensing

Figure 11:
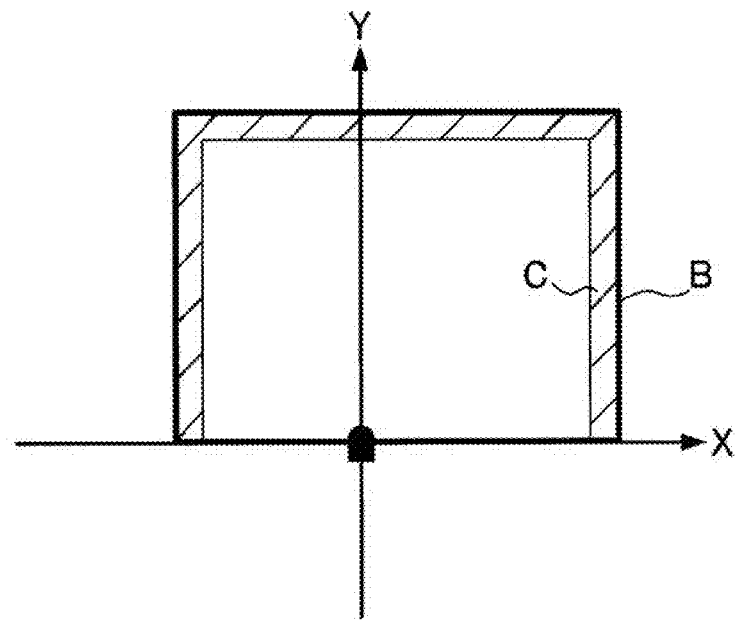
FIG. 11 is a diagram illustrating one example of an operation during test sensing of the safety sensor 1 shown in FIG. 2, in which a test sensing zone C is shown.

FIG. 11 is a diagram illustrating one example of the operation during test sensing of the safety sensor 1 shown in FIG. 2, in which a test sensing zone C defined as an area including three sides of the area B after its size has been specified is shown. The test sensing zone C is defined by the boundary line of the area B after the size has been specified by the operator.

In this example, the test sensing zone C is formed as an area including three sides excluding the side on which the safety sensor 1 is provided. Specifically, the test sensing zone C is an area including the boundary line of the area B and formed within the boundary line. The entrance of the intruder can be sensed within such a test sensing zone.

Figure 12:
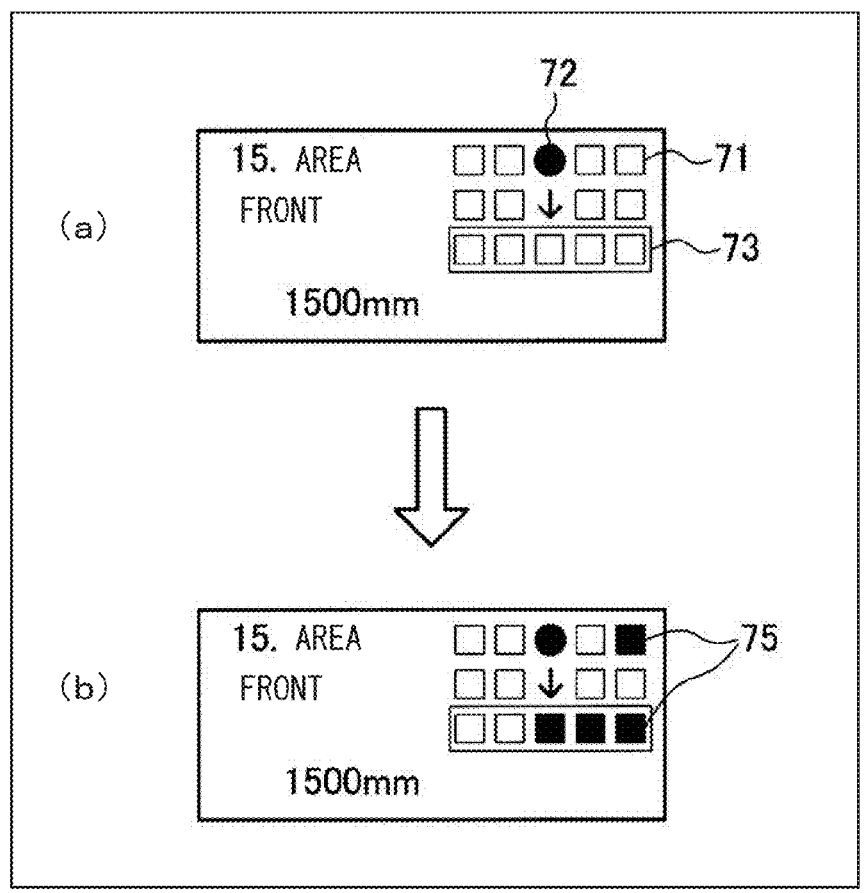
FIGS. 12A and 12B are diagrams each illustrating one example of the operation during test sensing of the safety sensor 1 shown in FIG. 2, in which an entrance of the intruder is sensed during the test sensing.

FIGS. 12A and 12B are diagrams each illustrating one example of the operation during test sensing of the safety sensor 1 shown in FIG. 2, in which an entrance of the intruder is sensed during the test sensing after the distance to the front boundary line has been set. FIG. 12A shows an input screen displayed when setting the distance to the front boundary line of the monitor area, and FIG. 12B shows an entrance position 75 of the intruder that has been sensed during the test sensing.

When determining the monitor area, the test sensing is carried out for the area B whose size has been specified by the operation input of the operator, in order to prevent erroneous setting.

The test sensing is carried out by sensing the intruder within the test sensing zone C that is formed along the boundary line of the area B, and it is sensed that the intruder entered the test sensing zone corresponding to the side of the monitor area based on a result of the sensing. Here, the working mode during the test sensing that is carried out by forming the test sensing zone is referred to as a boundary sensing mode.

When the entrance of the intruder is sensed, the entrance position 75 of the intruder is graphically displayed by displaying the corresponding symbol differently from other symbols. In this example, the entrance position 75 on each side is represented by highlighting the corresponding symbol 71 in reverse video.

When the intruder is sensed for all of the sides by the test sensing, the area setting information is updated so as to set the area B as a new monitor area.

Specifically, when the monitor area is previously set as the rectangular area, and when the entrance of the intruder is sensed at two or more points of at least the sides on which the safety sensor 1 is not provided, the area setting information is updated. In other words, when the plurality of symbols represent the entrance positions of the intruder on the front boundary line, the right boundary line, and the left boundary line, the area setting information is updated. For example, when all of the symbols on the sides represent the entrance positions of the intruder, the area setting information is updated.

On the other hand, when the entrance of the intruder on any of the sides that define the monitor area is not sensed, the area setting information is not updated.

Figure 13:
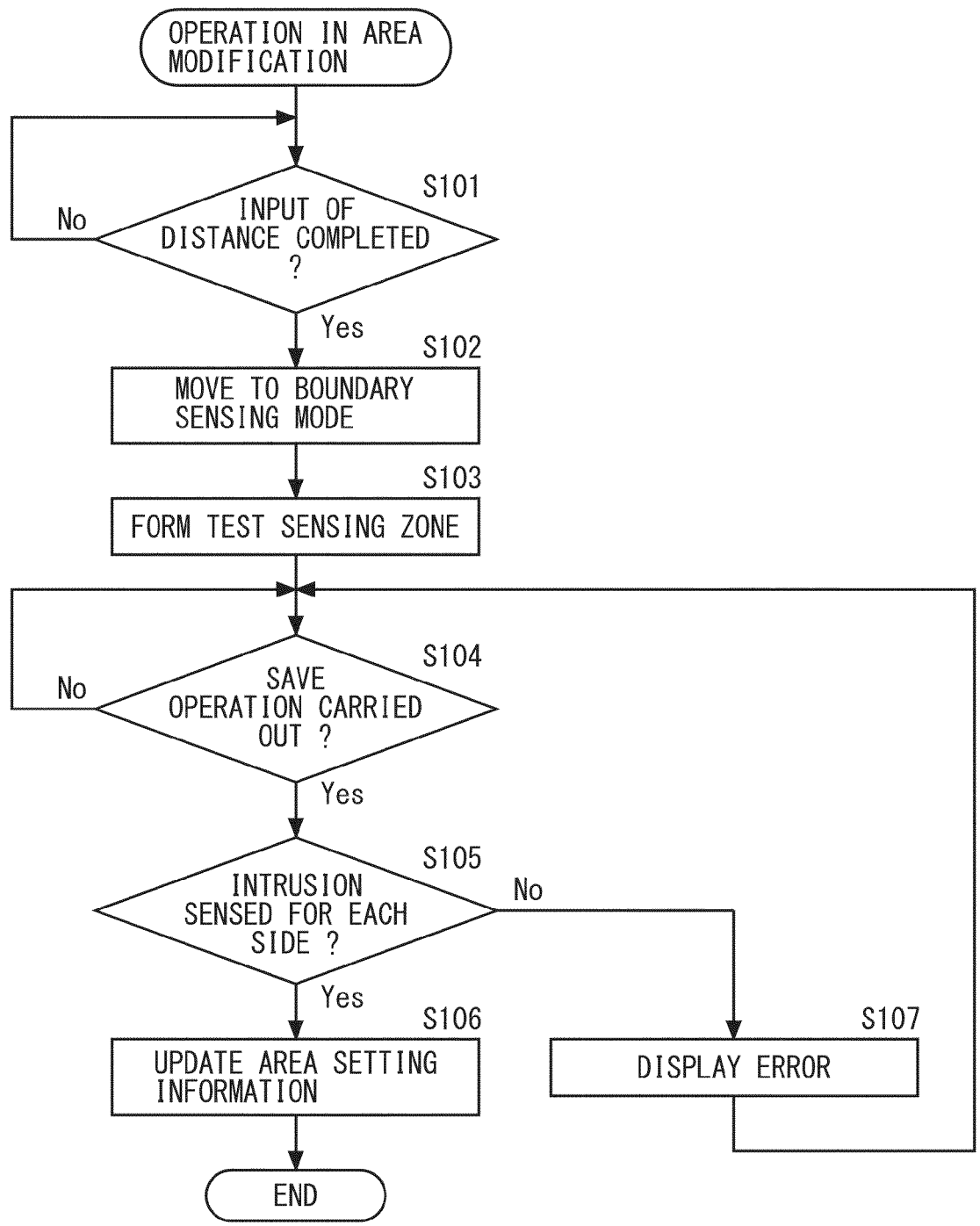
FIG. 13 is a flowchart illustrating one example of an operation during monitor area alteration of the safety sensor 1 shown in FIG. 2.

Steps S101 to S107 in FIG. 13 is a flowchart illustrating one example of the operation during monitor area alteration of the safety sensor 1 shown in FIG. 2. First, when the distances for the front boundary line, the left boundary line, and the right boundary line are inputted by the operator, the area size determination unit 64 is switched to the boundary sensing mode (steps S101, S102).

Next, the first intruder sensing unit 67 senses the intruder within the test sensing zone that is formed by the test sensing zone forming unit 66, and the boundary sensing unit 68 senses the entrance of the intruder on the sides that define the monitor area based on a result of the sensing by the first intruder sensing unit (step S103).

Then, once the setting values for the parameters are saved to confirm the setting values, the area size determination unit 64 inquires whether or not the entrance of the intruder on the sides that define the monitor area has been sensed (steps S104, S105). At this time, if the entrance of the intruder has been sensed on all of the sides, the area setting information is updated (step S106).

On the other hand, if there is any side on which the entrance of the intruder has not been sensed, an error indication is displayed (step S107), and the procedure of step S104 is repeated.

According to the present embodiment, it is possible to select the side on which the safety sensor 1 is not provided out of the plurality of sides that define the monitor area, and specify the distance between the safety sensor 1 and the side that is being selected. Further, as the size of the monitor area is determined based on the distance thus specified, the size of the monitor area of a predetermined shape as a polygonal shaped area defined by the plurality of sides can be arbitrarily set. Moreover, as the test sensing zone is formed and the intruder within the test sensing zone is sensed, it is possible to confirm whether or not the input values for the distances are appropriate for the respective sides. In particular, as the size of the monitor area is determined when the entrance of the intruder is sensed on all of the sides excluding at least one side, it is possible to prevent erroneously setting the monitor area. In addition, as the symbol corresponding to the entrance position of the intruder is displayed differently from other symbols when the entrance of the intruder is sensed, it is possible to identify the position on the side at which the intruder entered.

In the present embodiment, the safety sensor that confirms the setting values for the parameters when the saving operation is carried out is described. However, the present invention is not limited thereto, and can be such that, for example, by carrying out the saving operation after inputting the setting values for the parameters, the setting values for the parameters are stored in the memory, the stored setting values for the parameters are read out from the memory, the setting value for each parameter is displayed to have the user confirm the setting. In this case, the test sensing can be carried out separately for each side, or simultaneously for all of the sides without setting an order of the test sensing.

Second Embodiment

Monitor Display

In the first embodiment, the example in which the test sensing is carried out when determining the size of the monitor area is described. In the present embodiment, an example in which the position of the intruder is monitor displayed when specifying the size and during the test sensing is described.

Figure 14:
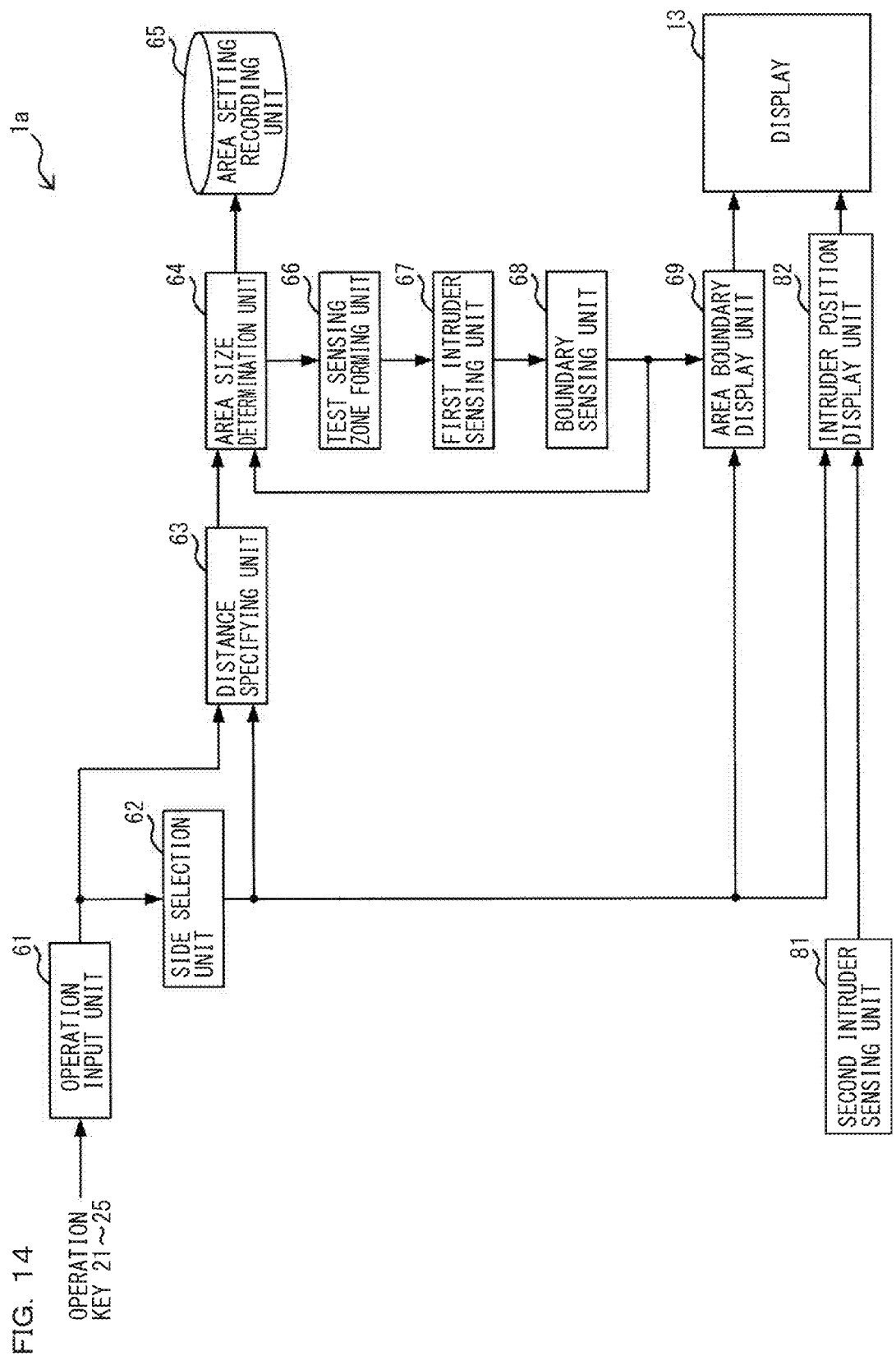
FIG. 14 is a block diagram illustrating one configurational example of a safety sensor 1a according to a second embodiment of the present invention.

FIG. 14 is a block diagram illustrating one configurational example of a safety sensor 1a according to a second embodiment of the present invention. The safety sensor 1a is different from the safety sensor 1 of FIG. 5 in that the safety sensor 1a includes a second intruder sensing unit 81 and an intruder position display unit 82.

The second intruder sensing unit 81 emits the detection light in the different directions, and senses the intruder based on the reflection of the detection light. The sensing of the intruder is carried out setting a maximum sensible area as the monitor area.

The intruder position display unit 82 displays the distance to the intruder sensed by the second intruder sensing unit 81. The intruder position display unit 82 displays the distance to the intruder by a component relating to a direction perpendicular to the side that is being selected by the side selection unit 62. Specifically, the distance between the X axis and the intruder is displayed if the front boundary line is being selected out of the sides that define the monitor area. Further, the distance between the Y axis and the intruder is displayed if the left boundary line or the right boundary line is being selected.

Figure 15A:
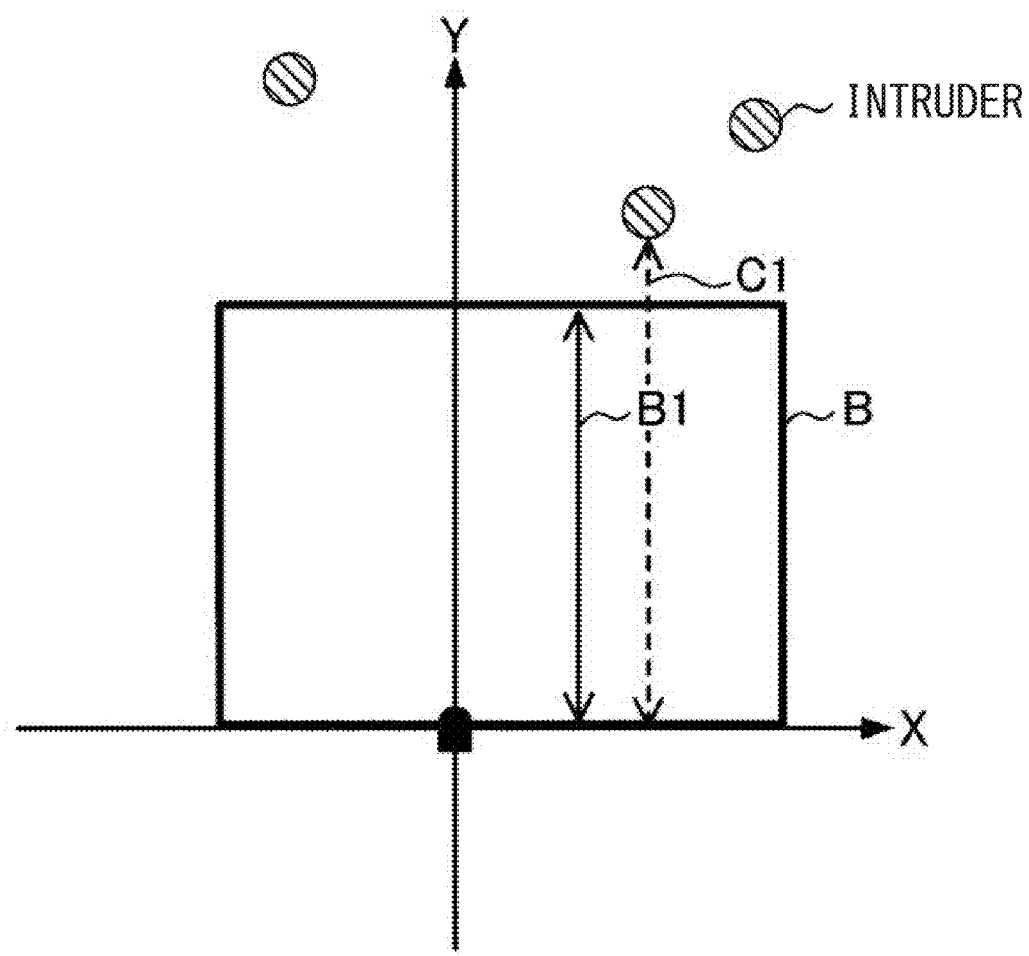
FIGS. 15A and 15B are diagrams each illustrating one example of an operation during monitor display of the safety sensor 1a shown in FIG. 14, in which a front boundary line of an area B is selected.
Figure 15B:
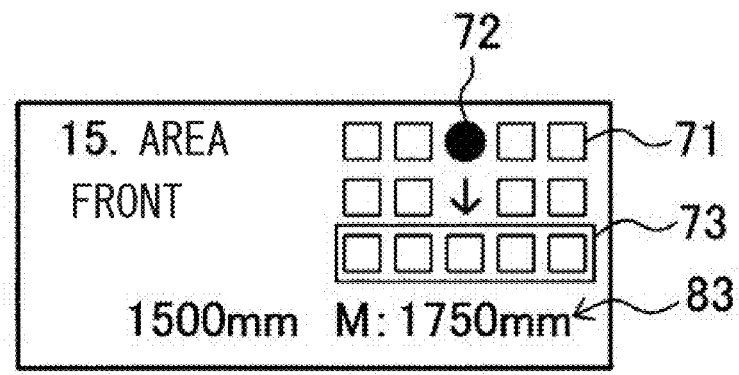

FIGS. 15A to 17B are diagrams each illustrating an example of the operation during the monitor display of the safety sensor 1a shown in FIG. 14. FIGS. 15A and 15B are diagrams each illustrating the example of the operation in which the front boundary line of the area B is selected. In FIG. 15A, a plurality of intruders sensed by the second intruder sensing unit 81 are displayed, and in FIG. 15B, an input screen for specifying a distance B1 to the front boundary line is displayed.

When the intruder is sensed by the second intruder sensing unit 81, a value indicating the distance to the sensed intruder is displayed in a monitor display section 83. The monitor display section 83 is provided below the symbols for showing the shape of the monitor area, in which a distance C1 between the X axis and the intruder is shown.

Here, when more than one intruder is sensed by a single scan, the distance C1 to the intruder, whose distance is the smallest, is displayed in the monitor display section 83.

Figure 16A:
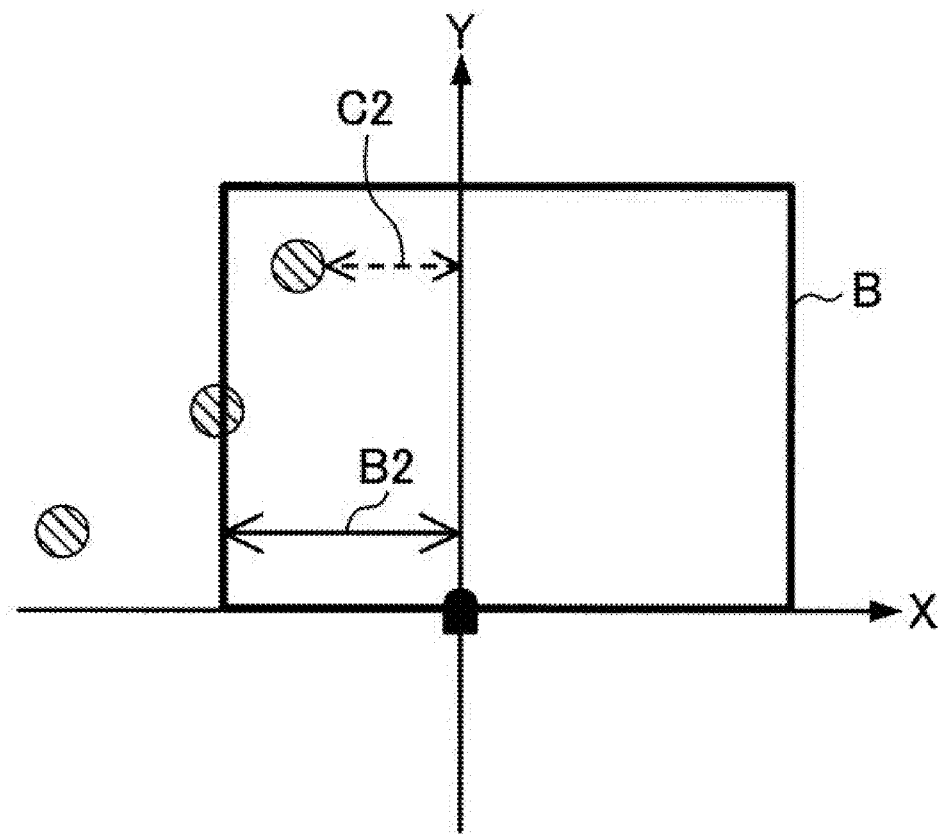
FIGS. 16A and 16B are diagrams each illustrating one example of the operation during monitor display of the safety sensor 1a shown in FIG. 14, in which a left boundary line of the area B is selected.
Figure 16B:
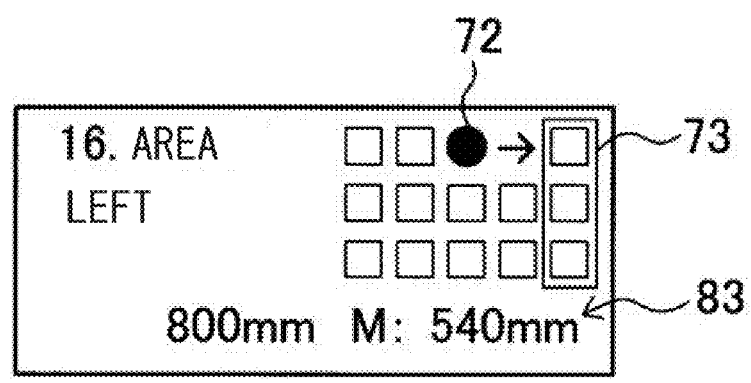

FIGS. 16A and 16B are diagrams each illustrating the example of the operation in which the left boundary line of the area B is selected. In FIG. 16A, a plurality of intruders sensed by the second intruder sensing unit 81 are displayed, and in FIG. 16B, an input screen for specifying a distance B2 to the left boundary line is displayed. In this case, a distance C2 between the Y axis and the intruder is displayed in the monitor display section 83.

Figure 17A:
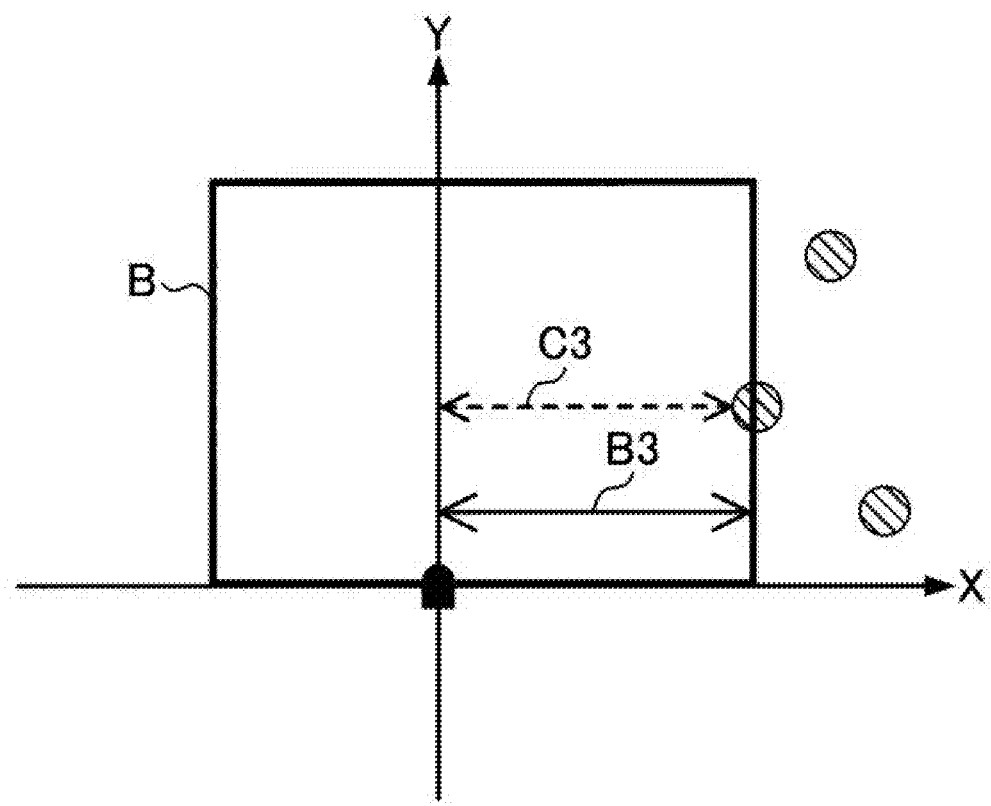
FIGS. 17A and 17B are diagrams each illustrating one example of the operation during monitor display of the safety sensor 1a shown in FIG. 14, in which a right boundary line of the area B is selected.
Figure 17B:
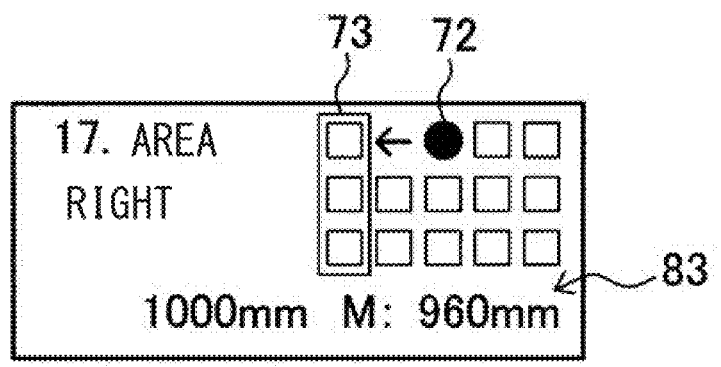

FIGS. 17A and 17B are diagrams each illustrating the example of the operation in which the right boundary line of the area B is selected. In FIG. 17A, a plurality of intruders sensed by the second intruder sensing unit 81 are displayed, and in FIG. 17B, an input screen for specifying a distance B3 to the right boundary line is displayed. In this case, a distance C3 between the Y axis and the intruder is displayed in the monitor display section 83.

The input screens can be switched between each other by operating the operation keys 21 and 22. In this case, the monitor display section 83 displays the distance to the intruder by the component relating to the direction perpendicular to the side that is being selected.

According to the present embodiment, as the distance to the intruder that has been sensed is displayed by the component relating to the direction perpendicular to the side that is being selected, the position of the intruder that has been sensed when specifying the size of the monitor area can be displayed according to the side that is being selected to input the distance.

While the present embodiment describes the example in which the position of the intruder is monitor displayed when the monitor area is previously set as the rectangular area, a case is conceivable in which, when the monitor area is set as a semicircular or fan-shaped area, the position of the intruder is monitor displayed by the distance from the safety sensor. In this case, it is conceivable that the distance to the intruder whose distance from a rotation shaft of the safety sensor for scanning is the smallest is monitor displayed.

Further, while the present embodiment describes the example in which the position of the intruder is monitor displayed when specifying the size and during the test sensing, a case is conceivable in which the size of the monitor area is determined based of the position of the intruder that has been sensed. Furthermore, another case is conceivable in which information for the position of the intruder that has been sensed is held as history information for each scan and displayed as needed.

What is claimed is:

1. An area monitoring sensor that emits detection light in different emitting directions and senses an intruder within a monitor area based on reflection of the detection light, the predetermined monitor area as a polygonal shaped area defined by three or more sides, the sensor being provided on a first side out of the sides of the monitor area, the sensor comprising:
    a side selecting unit that selects a second side other than the first side out of the three or more sides that define the monitor area based on an operation input;
    a distance specifying unit that specifies a distance between the area monitoring sensor and the second side selected by the side selecting unit based on an operation input; and
    an area size determining unit that determines a size of the monitor area based on the distance that has been specified by the distance specifying unit.

2. The area monitoring sensor according to claim 1, further comprising:
    a test sensing zone forming unit that forms a test sensing zone including at least one side other than the first side out of the monitor area, the zone being formed along the at least one side; and
    a first intruder sensing unit that senses an intruder within the test sensing zone based on reflection of the detection light.

3. The area monitoring sensor according to claim 2, further comprising:

a boundary sensing unit that senses that the intruder entering into the test sensing zone corresponding to the at least one side other than the first side based on a result of the sensing by the first intruder sensing unit, wherein when an entrance of the intruder is sensed for all of the sides at least other than the first side, the area size determining unit determines the size of the monitor area based on the distance specified by the distance specifying unit.

4. The area monitoring sensor according to claim 2, further comprising:

a boundary sensing unit that senses the intruder entering into the test sensing zone corresponding to the at least one side other than the first side based on a result of the sensing by the first intruder sensing unit; and an area boundary display unit that displays each side at least other than the first side out of the three or more sides that define the monitor area by two or more adjacent symbols, wherein when an entrance of the intruder is sensed by the boundary sensing unit, the area boundary display unit displays one of the symbols corresponding to a position at which the intruder enters differently from other symbols.

5. The area monitoring sensor according to claim 1, further comprising:

a second intruder sensing unit that senses an intruder based on reflection of the detection light; and an intruder position display unit that displays a distance to the intruder sensed by the second intruder sensing unit, wherein the intruder position display unit displays the distance to the intruder in a direction perpendicular to the second side selected by the side selecting unit.

6. The area monitoring sensor according to claim 1, further comprising:

an area boundary display unit that displays each side at least other than the first side out of the three or more sides that define the monitor area by two or more adjacent symbols, wherein the area boundary display unit displays the second side selected by the side selecting unit distinguishably from other sides.

7. An area monitoring sensor that emits detection light in different emitting directions and senses an intruder within a monitor area based on reflection of the detection light, the predetermined monitor area as a polygonal shaped area defined by three or more sides, the sensor being provided on a first side out of the sides of the monitor area, the sensor comprising:

an enclosure including a casing and a cover through which the detection light passes;

a display arranged on the casing, configured to display a setting screen;

an operation key arranged on the casing, operably connected to an operation unit;

a side selecting unit arranged within the enclosure, configured to select a second side other than the first side out of the three or more sides that define the monitor area based on the operation input;

a distance specifying unit arranged within the enclosure, configured to numerically specify a distance between the area monitoring sensor and the second side selected by the side selecting unit based on the operation input; and an area size determining unit arranged within the enclosure, configured to determine a size of the monitor area based on the distance that has been specified by the distance specifying unit.

8. The area monitoring sensor according to claim 7, further comprising:

an operating mode and a setting mode;

wherein an operation parameter for the operating mode is set during the setting mode by using the setting screen on the display.

9. The area monitoring sensor according to claim 8, comprising:

wherein the setting screen is switchable to another setting screen selected from a plurality of setting screens corresponding to a respective operation parameter for the operating mode based on the operation unit.

10. The area monitoring sensor according to claim 7, further comprising:

a memory arranged within the enclosure, configured to store an operation parameter set based on the operation unit;

a confirmation unit arranged within the enclosure, configured to confirm the operation parameter stored in the memory by a user;

wherein the area monitoring sensor outputs a disable signal when the operation parameter stored in the memory is not confirmed.

11. The area monitoring sensor according to claim 7, comprising:

wherein the setting screen includes the second side selected by the side selecting unit;

the setting screen displayed on the display is arranged such that the second side on the setting screen displayed on the display is the same direction as an actual direction of the second side on a basis of the area monitoring sensor.

* * * * *